United States Patent
Rodriguez

(10) Patent No.: US 9,380,355 B2
(45) Date of Patent: Jun. 28, 2016

(54) SECOND SCREENS AND WIDGETS

(71) Applicant: Digimarc Corporation, Beaverton, OR (US)

(72) Inventor: Tony F. Rodriguez, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 465 days.

(21) Appl. No.: 13/873,657

(22) Filed: Apr. 30, 2013

(65) Prior Publication Data

US 2013/0340011 A1   Dec. 19, 2013

Related U.S. Application Data

(63) Continuation of application No. 12/695,903, filed on Jan. 28, 2010, now Pat. No. 8,433,306.

(60) Provisional application No. 61/150,235, filed on Feb. 5, 2009.

(51) Int. Cl.
| | |
|---|---|
| *H04N 7/16* | (2011.01) |
| *H04N 21/81* | (2011.01) |
| *G06Q 30/02* | (2012.01) |
| *H04N 21/41* | (2011.01) |
| *H04N 21/436* | (2011.01) |
| *H04N 21/478* | (2011.01) |
| *H04N 21/61* | (2011.01) |
| *H04N 21/858* | (2011.01) |
| *H04L 29/08* | (2006.01) |

(52) U.S. Cl.
CPC .......... *H04N 21/8186* (2013.01); *G06Q 30/02* (2013.01); *H04L 67/04* (2013.01); *H04L 67/06* (2013.01); *H04L 67/125* (2013.01); *H04L 67/20* (2013.01); *H04N 21/4126* (2013.01); *H04N 21/43615* (2013.01); *H04N 21/478* (2013.01); *H04N 21/6131* (2013.01); *H04N 21/858* (2013.01)

(58) Field of Classification Search
CPC .......... H04N 21/8186; H04N 21/4126; H04N 21/43615; H04N 21/478; H04N 21/6131; H04N 21/858; H04L 67/06; H04L 67/20; H04L 67/125; H04L 67/04; G06Q 30/02
See application file for complete search history.

(56) References Cited

U.S. PATENT DOCUMENTS

| | | | |
|---|---|---|---|
| 5,831,664 A * | 11/1998 | Wharton | H04N 7/163 345/156 |
| 7,415,129 B2 | 8/2008 | Rhoads | |
| 7,562,392 B1 | 7/2009 | Rhoads | |
| 7,590,259 B2 | 9/2009 | Levy | |
| 7,693,965 B2 | 4/2010 | Rhoads | |
| 2002/0059597 A1 * | 5/2002 | Kikinis | H04N 5/4401 725/39 |
| 2002/0162121 A1 * | 10/2002 | Mitchell | H04N 7/165 725/135 |
| 2003/0103645 A1 | 6/2003 | Rhoads | |
| 2003/0112974 A1 | 6/2003 | Levy | |
| 2004/0261127 A1 * | 12/2004 | Freeman et al. | 725/135 |
| 2005/0251683 A1 | 11/2005 | Levy | |

(Continued)

FOREIGN PATENT DOCUMENTS

WO   2008073347 A1   6/2008

*Primary Examiner* — Oschta Montoya
(74) *Attorney, Agent, or Firm* — Digimarc Corporation

(57) ABSTRACT

Cell phones and other devices are used to complement enjoyment of television or other video media, through use of corresponding software applications ("widgets"). A great variety of related features and arrangements are particularly detailed.

6 Claims, 5 Drawing Sheets

(56) References Cited

U.S. PATENT DOCUMENTS

| | | |
|---|---|---|
| 2006/0280246 A1 | 12/2006 | Alattar |
| 2006/0288375 A1* | 12/2006 | Ortiz et al. ............... 725/62 |
| 2007/0110074 A1 | 5/2007 | Bradley |
| 2007/0169115 A1 | 7/2007 | Ko |
| 2007/0180485 A1 | 8/2007 | Dua |
| 2007/0244880 A1 | 10/2007 | Bartolome |
| 2007/0288966 A1 | 12/2007 | Sasha |
| 2008/0052348 A1 | 2/2008 | Duane |
| 2008/0208839 A1* | 8/2008 | Sheshagiri et al. ............... 707/5 |
| 2008/0288993 A1* | 11/2008 | Aghasaryan ....... H04N 7/17318 725/106 |
| 2009/0125609 A1 | 5/2009 | Sletten |
| 2010/0119208 A1 | 5/2010 | Rodriguez |
| 2010/0205628 A1 | 8/2010 | Rodriguez |

* cited by examiner

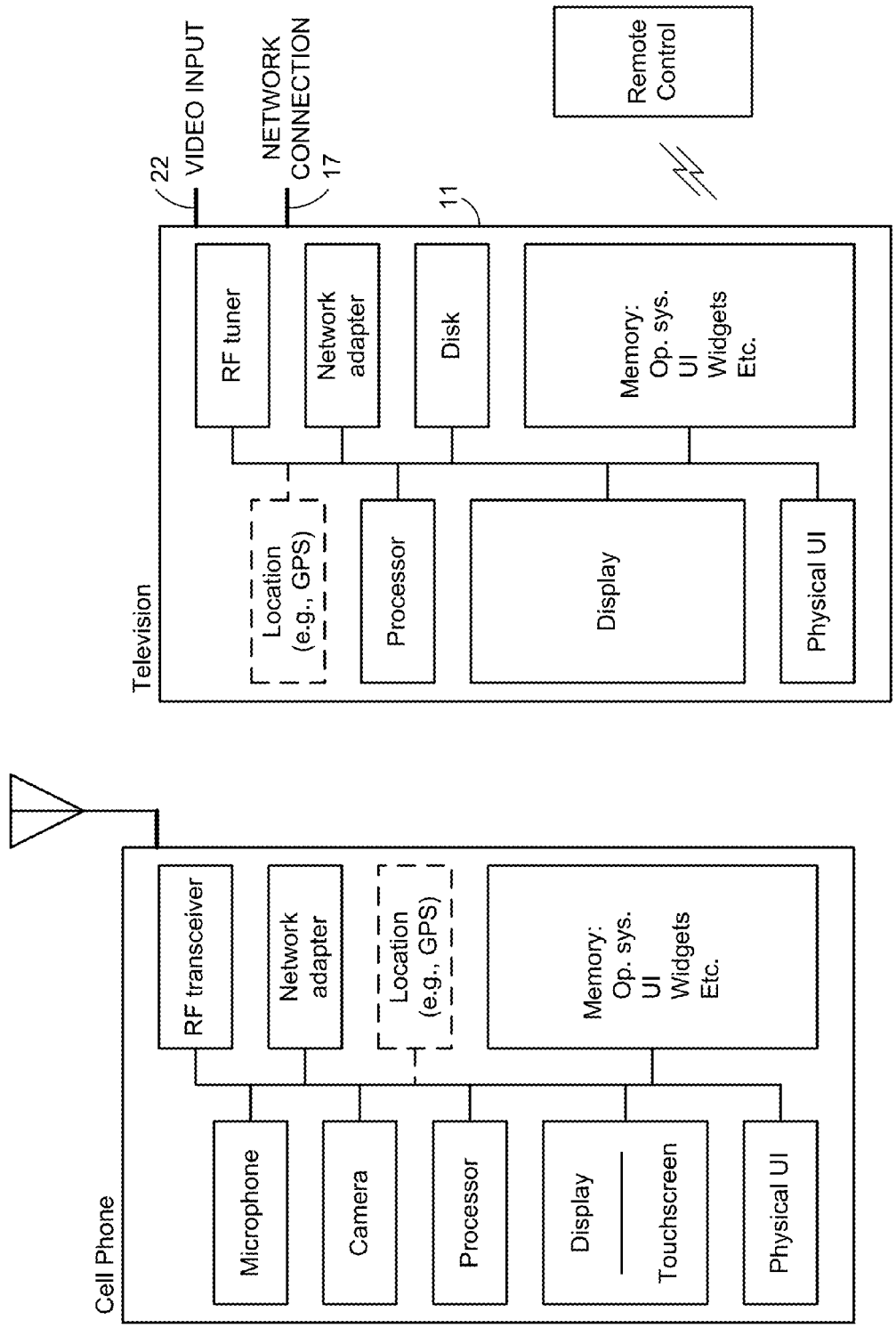

SECOND SCREENS AND WIDGETS

RELATED APPLICATION DATA

This application is a continuation of application Ser. No. 12/695,903, filed Jan. 28, 2010 (now U.S. Pat. No. 8,433, 306), which is a non-provisional of application Ser. No. 61/150,235, filed Feb. 5, 2009.

FIELD OF THE TECHNOLOGY

The present technology relates to portable devices, such as cell phones, and more particularly relates to use of television in conjunction with such devices.

BACKGROUND AND SUMMARY

The convergence of television and the internet continues. Recently introduced televisions (as well as various set-top boxes and Blu-Ray players) enable viewers to interact with "TV Widgets."

As Yahoo explained in an introductory press release in August, 2008, the Widget Channel is a television application framework that allows consumers to enjoy rich Internet applications designed for the TV while watching their favorite TV programs. The technology includes the Yahoo! Widget Engine—an applications platform that enables TV watchers to interact with and enjoy a rich set of "TV Widgets," or small Internet applications designed to complement and enhance the traditional TV watching experience and bring content, information and community features available on the Internet within easy reach of the remote control. The Widget Channel also allows developers to use Javascript®, XML, HTML and Adobe Flash® technology to write TV applications for the platform, extending the power and compatibility of PC application developer programs to TV and related consumer electronic devices.

Also supporting the initiative are Intel (whose Media Processor CE 3100 is used in initial implementations of the technology) and numerous partners who have authored widgets, including eBay, MySpace, CBS, AP News, The New York Times, Netflix, Amazon, Blockbuster, CinemaNow, Showtime, USA TODAY, Pandora, Rhapsody, Twitter, CBS Sports Fantasy Football, Acdeo Funspot Games, and Flickr. Yahoo is also making its news, weather, video and finance web offerings available in widget form. Manufacturers that are supporting the Widget Channel applications framework in their television offerings include Samsung, Sony, LG, Toshiba and Vizio.

Intel and Yahoo provide a Widget Development Kit (WDK) to interested developers, CE manufactures, advertisers, and content publishers. Comcast has also developed TV Widgets for tru2way capable HDTVs in order to create a richer set-top-less environment. (Tru2way is a Java-based platform with open API specifications, built into various televisions, settop boxes, DVRs, etc., to enable interactive cable services such as electronic program guides, advertisements, games, chat, web browsing, etc.)

The widget functionality is launched by pressing a special button on the television's remote control, which brings up the TV Widget dock—an overlay bar presented along the bottom of the television screen, populated with user-selected widgets (FIG. 5). The user operates arrow keys on the remote control to navigate to a desired application, and then presses an Enter button on the remote to invoke the chosen widget.

When a widget is invoked, it typically opens up as a sidebar window on the screen. For example, the Flickr widget presents different photo albums, from which the user can select pictures to view (FIG. 6). A slideshow—consuming the entire television screen—can be launched, if desired.

The Blockbuster widget, when launched, streams a high-definition trailer for a movie. The AP News widget presents a crawling display at the bottom of the screen with news headlines from desired categories (local, international, business, etc.). The CinemaNow widget allows a user to navigate through indexes of movies to select a desired movie for on-demand web viewing on the television screen. The MySpace widget allows user to read messages, view photos, etc., in a screen-side display. The Ebay widget permits shopping, and monitoring of the user's auctions, etc.

The technology is being marketed, in part, as a way to permit internet browsing from the family television—without having a computer in the user's lap. As a Sony representative explained at CES 2009, "At home, my wife likes to surf the internet or watch weather, news and sports with her laptop while she's watching TV. Now she'll be able to accomplish those functions on the television set itself." Continuing, the representative explained, "For customers who really like sports, and you're watching your favorite sports game and you have your computer going to follow other games, or you're doing it on a Blackberry-type device, now you'll be able to accomplish all of that in a very easy, user friendly fashion just on the screen of your Sony Bravia TV."

Contrary to these stated views, applicant believes that use of a second screen while watching television offers advantages to users, rather than being a problem that should be eliminated. (Instead, applicant believes excessive use of a shared screen is the underlying problem that has doomed interactive TV experiences. Indeed, who blocked out the catcher in the baseball game of FIG. 6 to review family photos on Flickr?)

In accordance with one aspect of the technology, TV widgets can be transferred to a cell phone, where they can be enjoyed by a user without consuming space on the television screen, and distracting other viewers.

In accordance with another aspect, a widget running on the user's cell phone provides a richer experience than the widget running on the television screen. (Since others may be watching the television screen, widget software typically tries to economize use of the television screen space. Functionality is thereby impaired. The widget running on the user's small screen does not have the constraint of considering other viewers.)

In accordance with another aspect of the technology, a network-connected television uses network protocols to advertise widgets to other devices on the network (e.g., cell phones), which can then download same.

In accordance with still another aspect, a cell phone's text-entry user interface is invoked to input text to a widget running on a television.

In accordance with yet another aspect of the technology, a TV widget may be transferred to a cell phone through interaction with a non-network connected television.

The foregoing are just a few of the novel aspects of the present technology. These and other features and advantages will be more readily apparent from the following detailed description, which proceeds with reference to the accompanying drawings.

BRIEF DESCRIPTION OF THE DRAWINGS

FIG. 3 is a block diagram of a cell phone used in an exemplary implementation.

FIG. 4 is a block diagram of a television used in an exemplary implementation.

DETAILED DESCRIPTION

Figure 1:
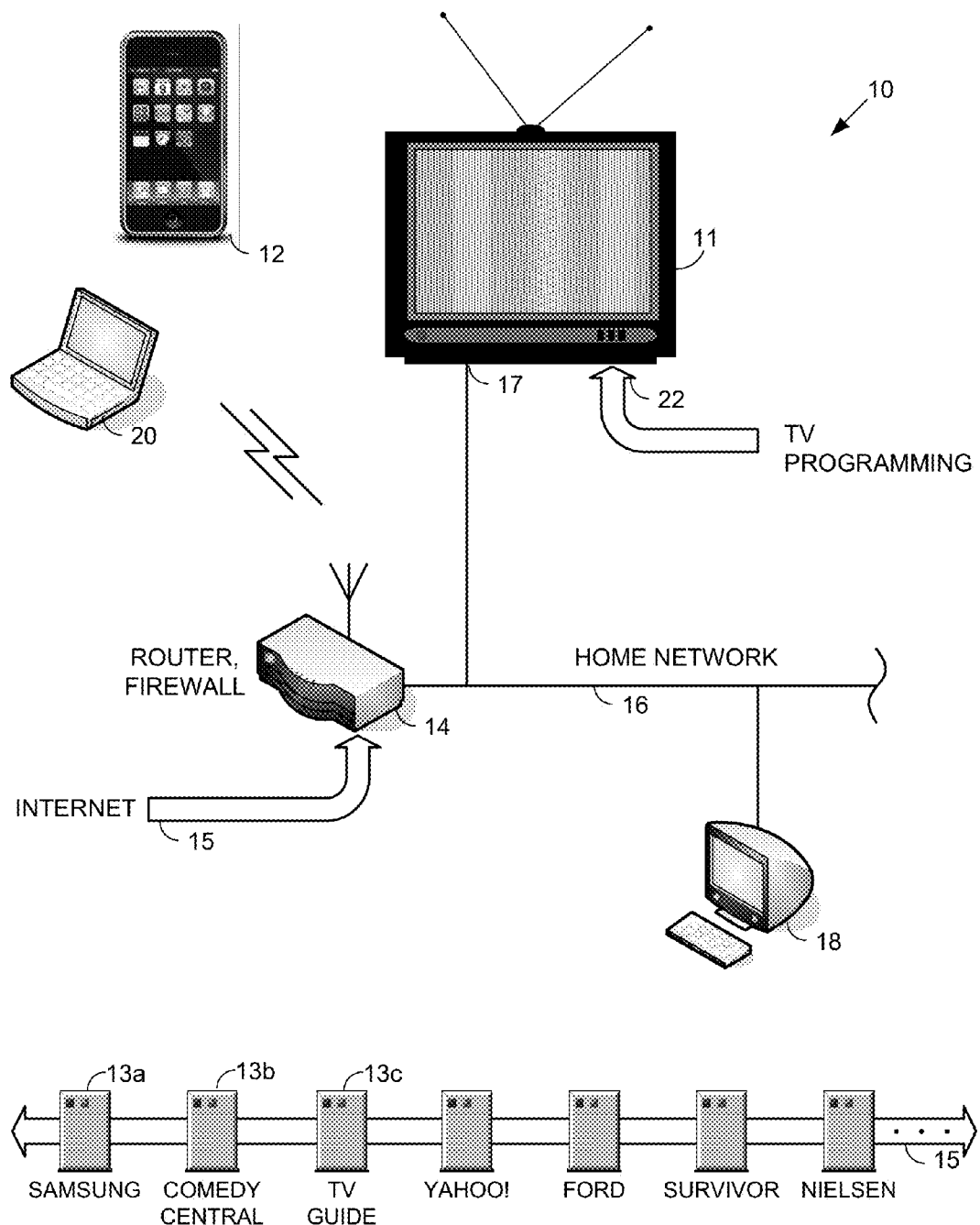
FIG. 1 is a diagram showing elements that may be involved in one sample system.

Referring to FIG. 1, an illustrative implementation 10 using aspects of the present technology may include a television 11, a cell phone 12, a router 14, and one or more internet-connected servers 13.

While television 11 is shown as a stand-alone unit, this term includes systems of various descriptions. For example, a "television" may include one or more of a monitor, a TV receiver, a set-top box, a digital video recorder, a Blu-Ray disc player, etc.

The depicted router 14 is connected to the internet 15, e.g., through a cable or DSL modem, and defines a home network 16—with both wired (e.g., Ethernet) and wireless (e.g., WiFi, 802.11) connections. The wired connection connects to a network connection 17 on the television 11, and may also connect to other devices (e.g., desktop computer 18). The wireless connection extends to other devices in the home domain, such as cell phone 12 and a laptop computer 20.

The television 11 also has an input 22 that is connected to a source of video programming. This source may include a set-top box, a satellite receiver, a cable network, or even an antenna. In some usage models the video programming may be provided across the network connection 17, rather than through a separate input.

Figure 2:
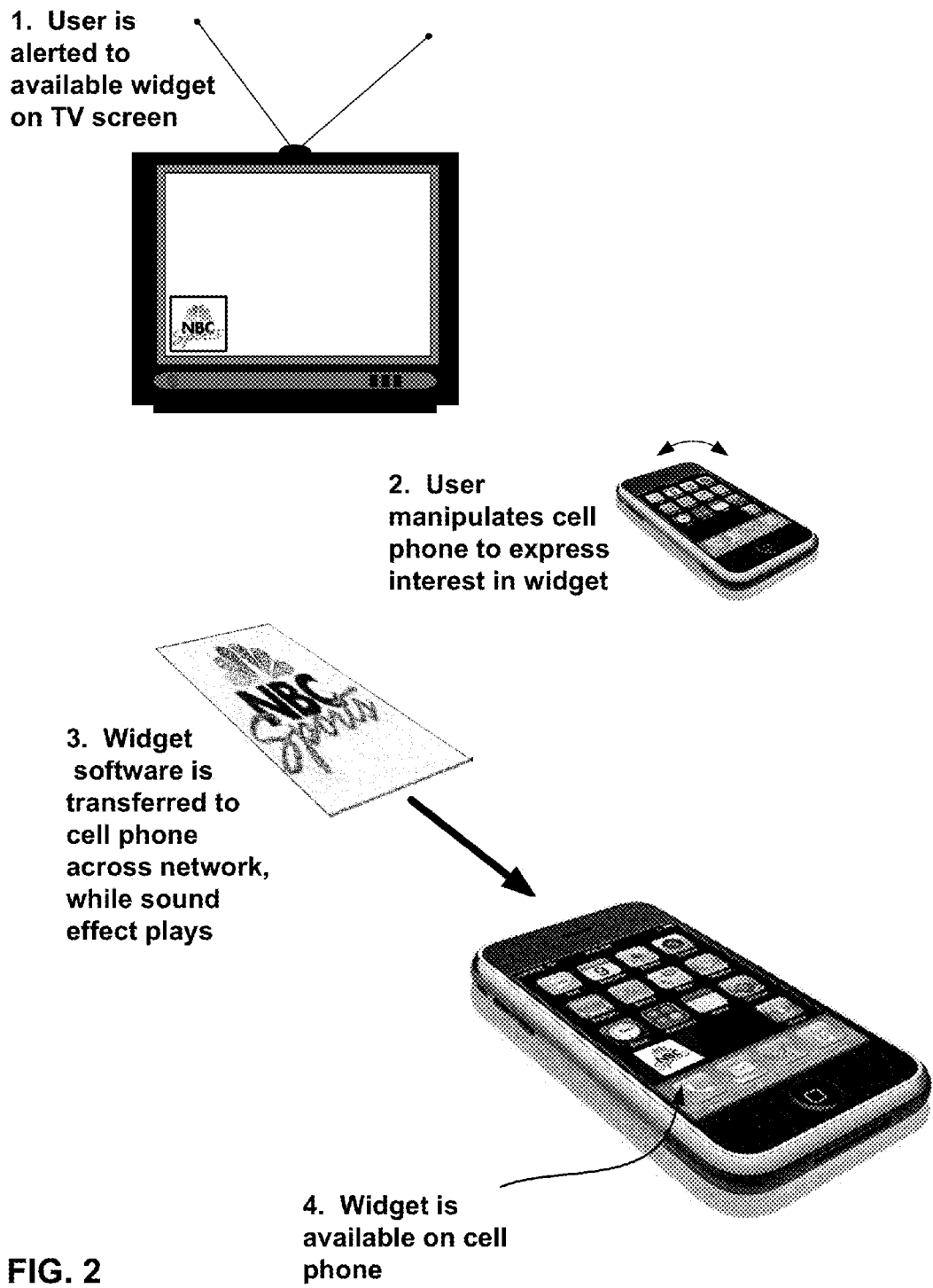
FIG. 2 depicts aspects of a user experience that can be associated with transferring a widget to a cell phone.

Referring to FIG. 2, one aspect of the present technology is an arrangement for easily downloading a widget to a cell phone.

The Apple iPhone is renowned for its ease of use, and the Apple iPhone App Store is similarly esteemed. To download a new application, the user navigates to the App Store web page, and navigates within the store to a desired application (e.g., by browsing, by text entry, by picking from Top Apps lists, etc). A payment is made—if required—and the user then instructs the application to be downloaded from the store to the phone. The downloaded application appears as an icon on the user's iPhone screen.

Although the App Store download arrangement is regarded as a model of straightforward simplicity, the present technology is simpler. When a widget is shown on the television screen, the user simply manipulates the cell phone to express interest. A gesture or two later, the widget is on the cell phone.

Figure 5:
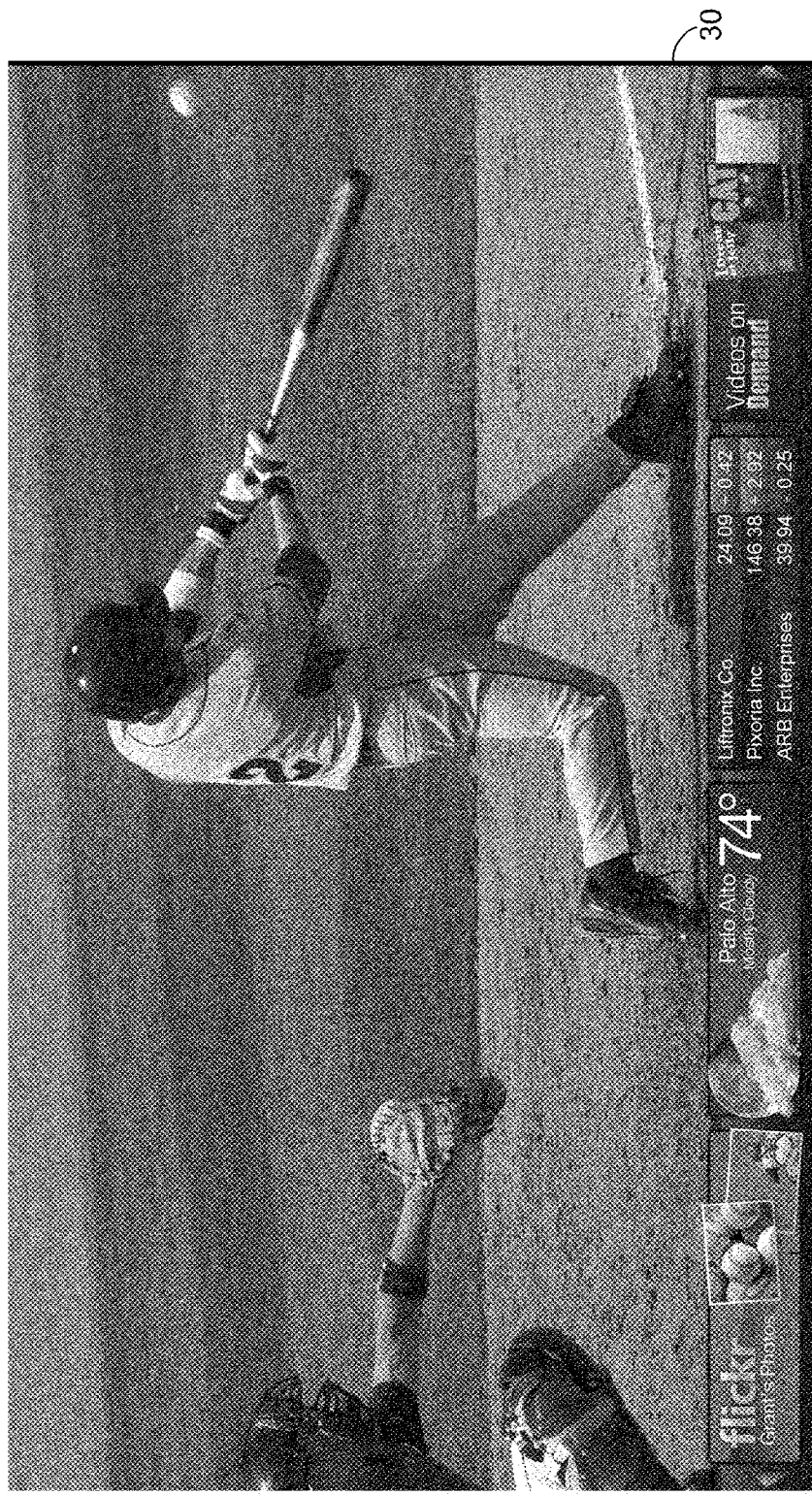
FIG. 5 shows a television screen including a selection of widgets in a widget bar (dock) along the bottom of the screen.

Consider the widgets shown along the base of the television screen 30 in FIG. 5. Shown are a Flickr widget 32, a weather widget, a stock ticker widget, and a videos-on-demand widget.

The user may express interest by pressing a virtual button on the iPhone (e.g., a GetWidget application). Or the iPhone may have a WatchingTV suite of software programs that automatically launches and runs in the background whenever the iPhone detects a nearby television (or it may be manually invoked by the user). While this suite of software is running, a simple shake of the iPhone, or a gesture in the direction of the screen, may signify the user's interest. A great number of other ways of sensing user interest are possible.

When there are several widgets displayed on the television (as in FIG. 5), and the user expresses interest, icons corresponding to all of the widgets are transferred to the iPhone. These icons wiggle on the iPhone display, inviting the user to press one to identify which is desired. In response to the user selection, the full software code for the selected widget is downloaded to the iPhone. The selected icon stabilizes, and the unselected icons disappear.

(If only one widget is on the television screen when the user expresses interest, there is no need for selection. The corresponding software is immediately downloaded to the iPhone, and the icon appears on the iPhone screen.)

As detailed below, the behind-the-scenes interactions that enable this simple downloading are a bit more complex, but from the user's standpoint it is an intuitive, easy process.

In the arrangements contemplated by Yahoo and its partners, a television comes with a small selection of pre-loaded widgets. To obtain other widgets, the user navigates to the Yahoo Widgets page on the web and downloads additional widgets from a large catalog of offerings.

Applicant believes other usage models will emerge and gain prominence.

In one such foreseen usage model, widgets are associated with different television programming. There may be a NBC Sports Superbowl widget, a CBS News widget, a Seattle Seahawks widget, an ESPN Monday Night Football widget, a WRKG weather widget, a Cox Cable widget, etc.

Each such widget is branded, and provides a look (and optionally a "feel") congruent with that of the programming or programmer with which it is associated. (Look and feel signifies the experience a user has with a product—such as a television show. Look can encompass aspects of design, such as colors, shapes, layout and typefaces. Feel can encompass the behavior of dynamic elements such as buttons, boxes, menus, transitions, sound effects, and other interactivity.)

In the contemplated usage model, when a user changes channels on a TV, the TV checks for widgets relevant to that channel and time (and optionally location), and alerts to the user to same. If the user tunes to Monday Night Football on ESPN, a logo may appear on the screen advising the user of the availability of the ESPN Monday Night Football widget. This logo may fade out after a few moments, but can be recalled by operating a Widget button on the television remote (in which case it is presented among the other available widgets along the bottom bar), or a similar button in the Watching TV suite of iPhone software. If the user expresses interest in the offered widget (e.g., by using the television remote control to highlight the widget, and pressing Enter, or by the arrangement earlier described for selecting widgets for download to a cell phone), the widget can be downloaded and run.

Thus, in this model, relevant widgets are "pushed" to the TV screen for possible selection, rather than being "pulled" by the user, e.g., from the Yahoo Widgets page.

Figure 6:
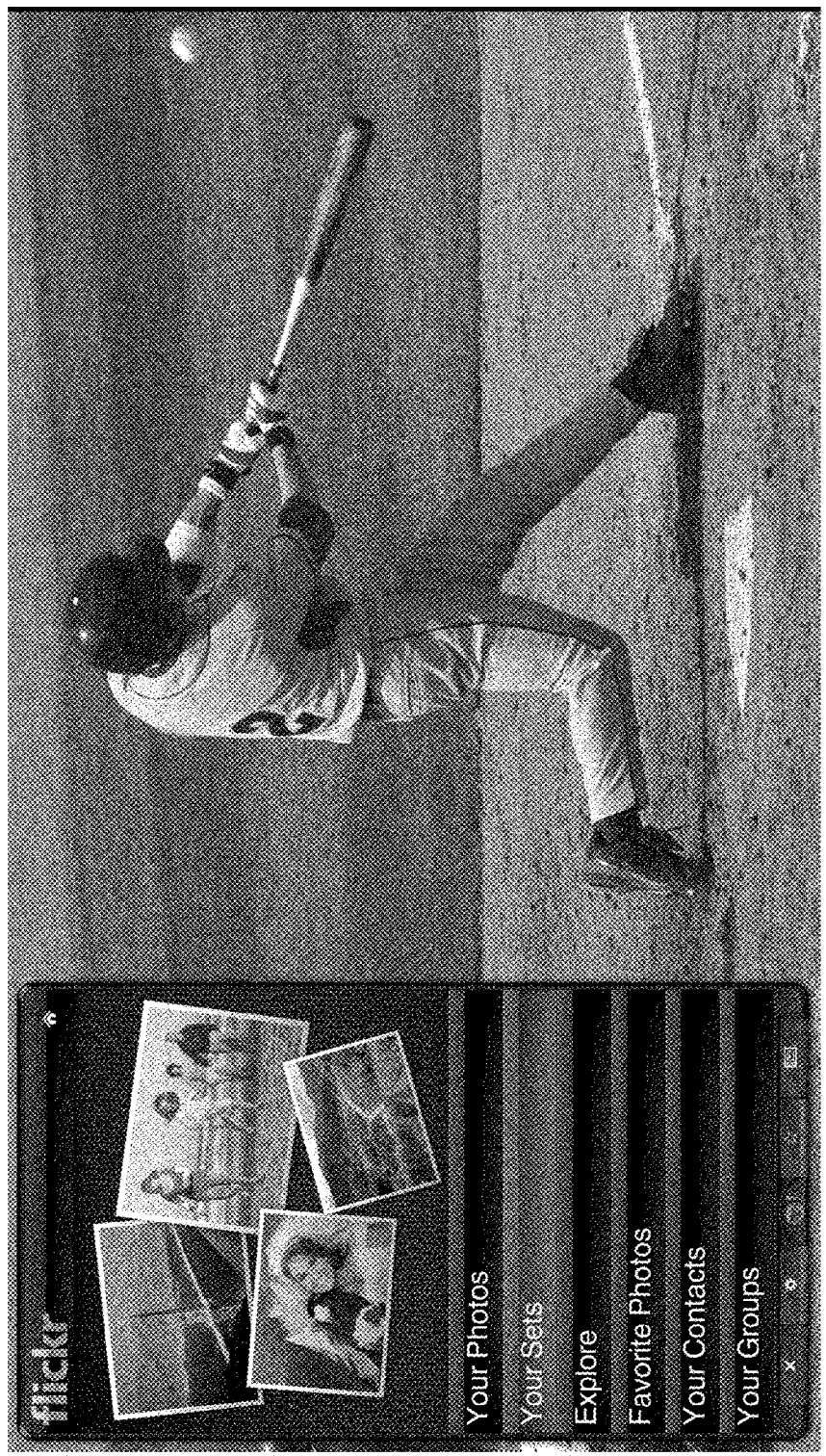
FIG. 6 shows the television screen of FIG. 5, after the Flickr widget has been selected.

In accordance with another aspect of the present technology, widgets may provide a richer set of functionality when run on a cell phone, than when run on the television. (On the television, screen obstruction is an issue: there may be other viewers who do not share the user's interest in a particular widget. Note how the baseball catcher on the left side of the screen is hidden in FIG. 6, after the Flickr widget is invoked).

Consider an ESPN Monday Night Football widget. When selected on the television screen, it may pop up a side-screen window on which game statistics, or game scores, are presented in scrolling fashion. To reduce interference with viewing of the football game, the space available to the widget is limited.

When the widget is invoked on the cell phone screen, in contrast, space is not a constraint. The widget can occupy the full screen, yet none of the action on the television screen is concealed. So instead of space-constrained output, the ESPN Monday Night Football widget can offer a variety of other options—commonly involving the full screen. Instead of just listing scores of other games, the scores may be hyperlinked—allowing the user to select a score (e.g., by touchscreen) and link to a full-cell-screen, live video feed from that other game.

Similarly, it will be recognized that ESPN's television crew has cameras positioned around the stadium, focused on different subjects. The ESPN producer—typically in a television truck in the parking lot—switches between the different camera feeds to produce the familiar network football footage. But some viewers have special interests that may be served by watching feeds not selected by the producer. A viewer who is a receiver on his high school football team may want to watch a feed from a camera covering a favorite pass receiver. A viewer who is himself a football coach may be interested in watching one of the coaches. Such alternate camera views may be among the options that the widget may offer to viewers on the cell phone, which are not available to viewers on the television screen.

Still other options may include player interviews, trivia games, etc.

Games are a further example of the richer functionality available on the cell phone platform. Widgets run on television screens are weak on text input. A TV remote allows a user to navigate up, down, left and right among displayed buttons, but provides only clumsy text input—if any. In contrast, text-entry on cell phones is common, and despite space constraints, many users are proficient. Inputs include physical keys (Blackberry), virtual keyboards (iPhone), and stylus text entry (e.g., Palm Graffiti, MobileWrite, etc.).

In one arrangement, the same binary software code is used by both the television and the cell phone. When executing, the code checks which platform is executing it, and varies its behavior accordingly. In other arrangements, variant widgets are used—one tailored to the television, and one tailored to the cell phone.

In some embodiments, hybrid execution environments are employed. For example, text entry may be done on the cell phone, and visual output may be presented on the television screen.

Exemplary Implementation

Delving further into technical implementations and features, the cell phone and the television are basically computers, equipped with slightly different components. As shown in FIGS. 3 and 4, each includes a processor, memory, and display. The processor in the cell phone is a Samsung S5L8900 ARM 620 MHz CPU, whereas the Intel Media Processor CE 3100 (based on the familiar X86 architecture) is used in the television. The memory in the cell phone comprises 128 MB of static DRAM, together with 8 or 16 GB of flash memory. A similar configuration may be used in the television, or additional memory can be provided to accommodate advanced video requirements. A disc storage can be provided instead or, or in addition to, flash memory.

Both devices store software in their memory, including an operating system, application programs (including widget software), and user interface software. (For details on the multi-touch interface employed by the iPhone, see Apple's U.S. Pat. No. 7,479,949.)

While the user interfaces for both devices are highly reliant on software, each has some physical UI components as well, such as the physical touch screen on the iPhone, and buttons on the television and its remote control The display on the cell phone is obviously smaller than on the television. The cell phone display can be a 3.5" (diagonally) LCD, with 480×320 pixels. The television display can be an LCD, OLED or plasma display, measuring 20 inches or more (diagonally), with a resolution of, e.g., 1920×1080 pixels.

Both devices include a network adapter. The cell phone is equipped with a WiFi adapter. Additionally, it can communicate using Quad band GSM/GPRS/EDGE: GSM 850/900/1800/1900. The television has an Ethernet (IEEE 802.3) interface.

Unlike the television, the cell phone additionally includes a camera (e.g., a 2 megapixel image sensor with associated lens, A/D converter, etc.) and a microphone. It also has a module by which it can determine its location. This module commonly performs location finding by reference to cell towers and WiFi networks. However, in other embodiments a GPS receiver can be included.

Although televisions do not yet have location-finding capability, applicant believes future generations of televisions should be provided with such functionality. In addition to other advantages, this will permit a television to determine its position relative to other devices, and vice-versa. One way in which this would be useful would be for auto-launching a WatchingTV suite of software applications on a nearby cell phone, when in proximity to a nearby, operating television.

One emerging location-finding technology relies on radio signaling of the sort that that commonly occurs between devices (e.g., WiFi, cellular, broadcast television). Given enough devices, the signals themselves—and the imperfect digital clock signals that control them—form a reference system from which both highly accurate time and position can be abstracted. Such technology is detailed in laid-open international patent publication WO08/073347.

In one particular implementation of the FIG. 2 system, the television advertises the widgets that are available for downloading to the cell phone 12 (or to other devices on the home network, such as laptop 20, or computer 18). This can be done using the Bonjour protocol.

Bonjour is Apple's trade name for its implementation of Zeroconf—a service discovery protocol. Bonjour locates devices on the local network, and identifies the services that each offers, using multicast Domain Name System service records. This software is built into the Apple MAC OS X operating system, and is also included in the Apple "Remote" application for the iPhone, where it is used to establish connections to iTunes libraries via WiFi. (TiVo uses Bonjour to locate digital video recorders and shared media libraries.)

Bonjour services are implemented at the application level largely using standard TCP/IP calls, rather than in the operating system. Apple has made the source code of the Bonjour multicast DNS responder—the core component of service discovery—available as a Darwin open source project. The project provides source code to build the responder daemon for a wide range of platforms, including Mac OS X, Linux, *BSD, Solaris, and Windows. In addition, Apple provides a user-installable set of services called Bonjour for Windows, as well as Java libraries.

In a sample implementation of the present technology, the television processor uses Bonjour to periodically (e.g., every second or every several seconds) send out on the home network subnet one or more packets advertising widgets that are available for downloading. The packets detail the names of the available widgets, and also provide the IP address of the television or other network location from which they are available. Desirably the widgets are listed in the order of their latest appearance on the television screen, so that the most-recently-presented widgets can be identified by listening devices. (The broadcast may be limited to just the widgets presently shown on the television screen, or a more exhaustive listing can be provided.)

All devices on the home network, including the WiFi-connected cell phone 12, can monitor these advertisements. The cell phone can cache the most-recently-received packet data, detailing the widgets currently available.

If the user manipulates the cell phone to express an interest in a widget, the cell phone listens for the Bonjour broadcast from the television (if it has not already been listening and caching such information). It then establishes a secure socket connection with the television—using the IP address from Bonjour broadcast. In one particular implementation, the cell phone requests transfer of software for the widget most-recently-presented on the television screen. In another implementation, the cell phone requests transfer of icons for all of the widgets then-shown in the bar along the bottom of the television screen (or for the N most-recently-presented widgets). These icons are displayed to the user on the cell phone screen, in vibrating fashion. Software on the cell phone enables the user to select one of the vibrating icons, causing its vibration to stop. The cell phone then requests, over the SSL connection, download of the software for that widget from the television. When download completes, the cell phone software removes the non-selected icons from the display—leaving the icon for the widget for which software was transferred.

During transfer of the widget software, the cell phone (or television) can emit a sound effect, such as a whooshing or sucking sound, to confirm to the user that a transfer is underway.

In some embodiments, the default behavior is for the cell phone to automatically launch the widget when the transfer is complete, so no further action by the user is required.

There are many variants and derivatives of Bonjour that can be employed in different embodiments. For example, the Bonjour Browser is a Creative Commons-licensed application that displays all services declared using Bonjour. Similarly, JBonjourBrowser is a Java-based version of this functionality, open-source and available under the GNU General Public License.

In other implementations a secure FTP connection can be established between the cell phone and the television to transfer the widget icon and/or binary software, e.g., in a compressed .zip file.

In still other implementations, Microsoft's .NET framework can be used. Using the remote services of .NET, a virtual machine running on the cell phone can ask what other portable execution components exist on other ends of the connection. .NET can open up a .NET connection to a remote machine (e.g., the television), and inquire about its inventory of widget objects. The cell phone can then execute desired objects locally, by copying byte codes.

In this and other implementations, it should be understood that the widget software code typically executes on the television (for display on the television screen) or on the cell phone (for display on the cell phone screen), but need not. Instead, the software may execute remotely. For example, a processor "in the cloud" may execute the widget functionality, and simply use the local device for input/output. Similarly, when a user invokes a widget on a cell phone, the system may be arranged so that the actual program execution occurs on the television's processor—with the cell phone interface simply being used for input/output.

As noted, applicant believes that the television should automatically advise the user of widgets relevant to programming currently being presented.

There are many ways this can be implemented. One is for the television to consult a remote registry each time the programming changes. A Samsung television may consult a Samsung registry maintained on server 13a; a Sony television may consult a Sony registry, etc. IP addresses for such "home" registries may be hard-coded into the television software.

When, for example, a user changes to a new channel, the television can send a query to its home registry (e.g., Samsung), inquiring about widgets relevant to channel 104 (or Comedy Central channel) at 8:05 pm pacific time. The Samsung registry can return information about relevant widgets directly, or can simply provide the IP address of a more specialized registry appropriate to that query. For example, it may return the IP address for a server operated by Comedy Central 13b, which provides widgets relevant to its programming. The television can then query the identified Comedy Central server for widgets relevant to the current time and place.

The television may cache the IP addresses sent from its home registry for relevant servers, so it need not ping the home registry as frequently. The TV can thus compile its own DNS of relevant servers, and ping the home registry only when its internal DNS does not have the needed data (or periodically, just to assure freshness of the cached information).

Such process can occur more frequently than just at channel-changes. At the beginning of each new program slot (e.g., every 30 minutes), the television may inquire about relevant widgets for that channel and time.

Given network traffic burdens associated with large numbers of televisions making such synchronized requests to a limited number of servers, the widget information may be requested earlier, and cached in the television—or at an intermediate network node. Or schedules of relevant widgets for each channel can be pushed to the television—just as is presently done with electronic program guide data (e.g., a week or two of data may be uploaded to the television during off-peak hours). For example, a TV Guide server 13c that provides electronic program guide information to the television can also provide a listing of widgets associated with each program.

(While FIG. 1 shows a few different servers, a great many more can be utilized. Each widget publisher can have its own server, or several widgets can be served from a common host, such as Yahoo!)

Still other schedules for updating widget availability can be employed. Each time a football broadcast returns from a commercial break, the network may want to update the roster of available widgets displayed on the television screen, or remind the user of widgets earlier-presented that are still relevant. For example, when returning to an NBC football game from a commercial break, the user may be presented with three widgets: an NBC-branded football schedule widget; an NBC-branded football statistics widget, and an NBC-branded football score widget. As noted, each has a "look" that is similar to the look of the NBC football programming with which it is associated—providing a consistency of experience. ("Feel" elements may also be shared, such as transitions, sound effects, etc.)

Even commercials may have their own widgets—with Ford's commercial being accompanied by a widget that provides a driving simulator for a promoted vehicle, with Disney's commercial accompanied by a widget that provides an extended preview for a promoted movie, etc.

In some embodiments, available widgets are presented within an electronic program guide UI. A viewer navigating an EPG may be alerted to the presence of associated widgets by a logo or other visual feature. Selecting the logo, or operating a button on a remote control while a program is highlighted, brings up a listing of associated widgets on the display screen being used (typically on the television, but alternatively on the cell phone). These widgets can be invoked directly from within the EPG UI. Widgets that are not already resident on the device from which they are selected can be downloaded—from another device in the home network (e.g., from a television to a cell phone) or from a remote server 13.

Widgets identified as relevant can be downloaded to the television in their entirety, or simple icons promoting such widgets can be transferred—with the software itself being transferred if/when the widget is invoked, or transferred to the cell phone, by the user. (In the latter case, the software code may bypass the television, and be transferred to the cell phone directly from a remote server. In such case, the television may nonetheless advertise the availability of the widget(s) using Bonjour.)

In some implementations, a search may be conducted for relevant widgets, using keywords. Such a search can be automatically undertaken by the television upon a prompting event (e.g., a channel change or commercial break), or a search can be manually invoked by a user (e.g., who may want to choose from a broader selection of widgets than are explicitly associated with different items of programming by associated servers). The results of the former search can populate a dock along the edge of the television screen—as with other widgets. The results of the latter search may bypass presentation on the television, and be presented exclusively on the cell phone.

Over time, the user may transfer a large number of TV widgets onto the cell phone. Selecting among them becomes more difficult as the number grows larger.

In some embodiments, the periodic Bojour Bonjour broadcasts from the television specify the channel and/or network to which it is currently tuned, and/or the programming that is currently being presented. The user's cell phone receives this information, and adapts its display of TV widgets accordingly. If the television is tuned to ESPN, the cell phone will not display stored widgets associated with Disney or CBS news (at least not on the default screen). Instead, it presents a screen that includes only the TV widgets relevant to the identified ESPN program. As the user changes channels of the TV, the widgets displayed on the cell phone change correspondingly.

As noted, the widgets themselves are short software applications that can be authored using JavaScript®, XML, HTML, Adobe Flash®, etc. They may be regarded as mobile agents—software components that can move between devices and execution environments. Widget execution can employ a JavaScript runtime environment combined with an XML interpreter. This environment includes the ability to make calls to the internet to retrieve web pages, to interact with online scripts, as well as file input/output. A built-in interface allows execution of OS-specific code, such as shell scripts and COM applications on Windows, and AppleScript on Apple machines.

Although described above as executing on the cell phone while the user is also watching a television screen, the widgets can be executed at any time or place. The television thus becomes a distribution point for widgets, but not an anchor for their use.

While a network connection for the television is necessary in certain embodiments, features of the present technology can be employed even with older-style televisions, with no computer or network capability. In such cases, a cell phone can discern availability of widgets based on visual or audio signals sensed from the television.

Many television programs are identified by distinctive logos, splash screens, or musical themes. Within individual programs, certain graphics may recur to present different events or information. An example is the score box presented in basketball games. The ESPN box has a well defined format (aspect ratio, border width, color, layout, brand artwork, screen placement, etc.). The NBC Sports box also conveys score information, but is visually distinct from the ESPN box—with its own distinctive format.

These visual features can be captured from the television screen by a cell phone camera, recognized, and used to identify associated widgets that can be downloaded to the cell phone.

Research into pattern recognition is extensive, and much of it is applicable in the present context. On large body of work is known as "fingerprinting" and seeks to identify visual objects by distilling a frame of image pixels (or sequence of frames) down into one or more hash codes or feature vectors by which objects within the frame can be recognized. The reader is referred to two exemplary papers for additional information: Swaminathan, et al, "Image Hashing Resilient to Geometric and Filtering Operations," 2004 IEEE Workshop on Multimedia Signal Processing, pp. 355-358, and Kim et al, "Spatiotemporal Sequence Matching for Efficient Video Copy Protection," IEEE Trans. on Circuits and Systems for Video Technology, Vol. 15, No. 1, January, 2005, pp. 127-132.

Image and video fingerprinting techniques are detailed in U.S. Pat. No. 7,020,304 (Digimarc), U.S. Pat. No. 7,486,827 (Seiko-Epson), patent publications 20070253594 (Vobile), 20080317278 (Thomson), and 20020044659 (NEC).

Related to fingerprinting are scale invariant feature transforms (SIFT), as detailed in Lowe, "Distinctive Image Features from Scale-Invariant Keypoints," *International Journal of Computer Vision*, 60, 2 (2004), pp. 91-110; Lowe, "Object Recognition from Local Scale-Invariant Features," *International Conference on Computer Vision*, Corfu, Greece (September 1999), pp. 1150-1157, and in U.S. Pat. No. 6,711,293. Again, SIFT data derived from imagery can be stored in a database, and used as identification data by which a video program (or portion) can be recognized.

When a cell phone captures an image, features within the image can be extracted by the cell phone processor (or the image data can be referred to a remote processor for analysis, or the process can be distributed between the cell phone and a remote processor). Once a set of characterizing features has been discerned, they can be applied to a database of reference features—associated with known logos, events, information, or programs. If features discerned from the television screen match a set of reference features from the database, corresponding identification information can be retrieved from the database (e.g., there is an ESPN basketball box score in the captured image data).

Once such an identification has been made, one or more corresponding widgets can be identified. A keyword search can be conducted. Or the database containing the reference fingerprints may also contain links to one or more widgets appropriate for each identified feature.

In the example cited, the widget may be an ESPN basketball applet that gives the user the ability to browse scores of basketball games, view highlights from the in-process game, review statistics for the in-process game or the participating teams, etc.

Audio fingerprinting can be used to similar effect—identifying distinctive sound effects, theme songs, etc., that are associated with different programs, from which corresponding widgets can be determined.

Examples of audio fingerprinting are detailed in patent publications 20070250716, 20070174059 and 20080300011 (Digimarc), 20080276265, 20070274537 and 20050232411 (Nielsen), 20070124756 (Google), U.S. Pat. No. 7,516,074 (Auditude), and U.S. Pat. Nos. 6,990,453 and 7,359,889 (both Shazam). Examples of image/video fingerprinting are detailed in U.S. Pat. No. 7,020,304 (Digimarc), U.S. Pat. No. 7,486,827 (Seiko-Epson), patent publications 20070253594 (Vobile), 20080317278 (Thomson), and 20020044659 (NEC).

Another identification technology is digital watermarking (described, e.g., in Digimarc U.S. Pat. Nos. 6,122,403 and 6,590,996 and Nielsen U.S. Pat. No. 6,968,564). The audio of most US broadcast television is digitally watermarked, encoding source and time data, to assist Nielsen in identifying programs for rating surveys, etc. Nielsen maintains a database that correlates the source/time data with program names and other identifiers. A cell phone can capture the television audio, and the encoded watermark can be extracted. The resulting information can be applied to the Nielsen database. With program identification returned from the database, relevant widgets can be identified. (Or, as above, the database can explicitly associate one or more widgets with different programs.)

Related technologies that are useful in conjunction with the methods and arrangements detailed herein are disclosed in U.S. application Ser. No. 12/271,692, filed Nov. 14, 2008 (published as 20100046842); Ser. No. 12/271,772, filed Nov. 14, 2008 (published as 20100119208); Ser. No. 12/484,115, filed Jun. 12, 2009 (now U.S. Pat. No. 8,385,971); Ser. No. 12/490,980, filed Jun. 24, 2009 (published as 20100205628); and Ser. No. 12/640,386, filed Dec. 17, 2009 (now U.S. Pat. No. 8,175,617).

Other Beneficiaries

By involving a personal second screen, the present technology extends and enhances the user's enjoyment of entertainment content—without impairing the experience of others who may be watching the same main television screen.

Additionally, the second screen provides benefits to other parties, such as content-providers, advertisers and audience measurement companies.

Content-providers benefit because widgets on cell phones can extend their media footprint from a stationary big screen to a pocket-sized, ever-present appliance. No longer need CBS News be just an evening news fixture in the den. CBS can jump from the big screen to the small screen, and become a user's preferred source of news whenever and wherever. While originally spawned from the big screen, the CBS widget is not tethered to it. Never before have traditional media companies been given such an easy way to extend their programming reach to personal devices.

In audience measurement, one shortcoming of existing techniques is uncertainty about who is watching a television screen, and to what degree. Personal People Meter devices and the like help identify who is in the room with a television, but provide no insight to the amount of attention being paid to a screen.

By extending the user experience to a personal second screen, better metrics can be obtained about audience involvement, since much of the "second screen" experience is interactive—with users navigating, selecting links, engaging the UI to play games, etc. In some embodiments of the present technology, user interaction with widgets is reflected in data received by the widget publisher or another data collection entity, allowing the user's engagement with the widget to be quantized. When, as contemplated by the present technology, widgets proliferate to the point that each television program (or even each commercial) has one or more associated widgets with it, then tracking widget activity becomes a proxy for viewer engagement with the associated television content, or the advertising subject. Rich, moment-by-moment information about user involvement can then be provided (subject to appropriate privacy protections, such as anonymization).

As user attention shifts from the big, shared screen to the second, more personal screen, the value of the second screen to advertisers increases. The demographic profile of a particular cell phone user can be defined much more precisely than the profile for a television, which is often shared by all members of a household. With more precise demographics, ads may be better targeted; so that teens' time isn't wasted with diaper commercials, nor senior citizens' time with promotions for rapper videos. Widgets can include code that automatically inserts product placements or other commercial promotions tailored to the owner of the second screen. User responses (e.g., interactions) can be measured, to help advertisers gauge effectiveness of different promotions. Revenues paid for such precisely engineered ads increase, helping producers fund content of interest to their audiences. Likewise, better information about programming that engages a particular viewer can help content providers better serve the viewer, e.g., by producing programming better tailored to the viewer's interests, alerting to the viewer to upcoming programming of likely interest, etc.

Conclusion

Having described and illustrated the principles of the technology by reference to a variety of embodiments, it will be apparent that the technology can be implemented in many other forms and fashions. The arrangements particularly detailed are illustrative, not exhaustive.

For example, while reference has been made to cell phones as second screen devices, it will be recognized that this technology finds utility with all manner of devices—both portable and fixed. PDAs, organizers, portable music players, desktop computers, laptop computers, tablet computers, netbooks, ultraportables, wearable computers, servers, etc., can all make use of the principles detailed herein. Particularly contemplated cell phones include the Apple iPhone, and cell phones following Google's Android specification (e.g., the T-Mobile G1 phone, the Motorola Droid phone, and the Google Nexus phone). The term "cell phone" should be construed to encompass all such devices, even those that are not strictly-speaking cellular (e.g., WiFi may be used exclusively), nor telephones.

Similarly, while the specification has made repeated reference to elements such as cell phones and graphical user interfaces, it will be recognized that many of the detailed elements will be superseded in years to come. Headworn display devices with integrated cameras, and gestural interfaces, for example, are already appearing. Thus, it should be recognized that the detailed arrangements are illustrative, and not meant to limit the forms in which the detailed technology can be practiced.

Occasional reference was made to the television remote control. The remote control typically has a button pad for input, and a transmitter (commonly including an infrared diode) to send instructions to the television. While the remote control can not serve as a cell phone, a cell phone can serve as a remote control—to issue commands to a television. Rather than sending commands by infrared, the commands may be sent across the home network, or by Bluetooth, etc. The LCD display of the cell phone, together with its considerable computational power, make it a formidable remote control. One particular application is navigating EPGs. The EPG can be presented on the cell phone display, and the display can be navigated using the superior UI of the cell phone (e.g., touch screen gestures). When a user selects a program, e.g., by touching a box on a displayed EPG grid, a corresponding command can be sent to the television, e.g., causing it to tune to the selected channel, or undertake other desired operations (e.g., record a program in the future; play a program earlier recorded; find a program on the web, etc).

While the specification has focused on television, it will be recognized that the detailed principles are equally applicable to other forms of entertainment content.

The design of cell phones and other devices referenced in this disclosure is familiar to the artisan. In general terms, each includes one or more processors (e.g., of an Intel, AMD or ARM variety), one or more memories (e.g. RAM), storage (e.g., a disk or flash memory), a user interface (which may include, e.g., a keypad, a TFT LCD or OLED display screen, touch or other gesture sensors, a camera or other optical sensor, a compass sensor, a 3D magnetometer, a 3-axis accelerometer, a microphone, etc., together with software instructions for providing a graphical user interface), interconnections between these elements (e.g., buses), and an interface for communicating with other devices (which may be wireless, such as GSM, CDMA, W-CDMA, CDMA2000, TDMA, EV-DO, HSDPA, WiFi, WiMax, mesh networks, Zigbee and other 802.15 arrangements, or Bluetooth, and/or wired, such as through an Ethernet local area network, a T-1 internet connection, etc).

More generally, the processes and system components detailed in this specification may be implemented as instructions for computing devices, including general purpose processor instructions for a variety of programmable processors, including microprocessors, graphics processing units (GPUs, such as the nVidia Tegra APX 2600), digital signal processors (e.g., the Texas Instruments TMS320 series devices), etc. These instructions may be implemented as software, firmware, etc. These instructions can also be implemented in various forms of processor circuitry, including programmable logic devices, FPGAs (e.g., Xilinx Virtex series devices), FPOAs (e.g., PicoChip brand devices), and application specific circuits—including digital, analog and mixed analog/digital circuitry. Execution of the instructions can be distributed among processors and/or made parallel across processors within a device or across a network of devices. Transformation of content signal data may also be distributed among different processor and memory devices.

Software instructions for implementing the detailed functionality can be readily authored by artisans, from the descriptions provided herein, e.g., written in C, C++, Visual Basic, Java, Python, Tcl, Perl, Scheme, Ruby, etc. Mobile devices according to the present technology can include software modules for performing the different functions and acts.

While this disclosure has detailed particular ordering of acts and particular combinations of elements in the illustrative embodiments, it will be recognized that other methods may re-order acts (possibly omitting some and adding others), and other combinations may omit some elements and add others, etc.

Although disclosed as complete systems, sub-combinations of the detailed arrangements are also separately contemplated.

Elements and teachings within the different embodiments disclosed in the present specification are also meant to be exchanged and combined.

Reference was made to the internet. In other embodiments, other networks—including private networks of computers—can be employed also, or instead.

It will be recognized that the detailed processing of content signals (e.g., image signals, audio signals, etc.) includes the transformation of these signals in various physical forms. Images and video (forms of electromagnetic waves traveling through physical space and depicting physical objects) may be captured from physical objects using cameras or other capture equipment, or generated by a computing device. Similarly, audio pressure waves traveling through a physical medium may be captured using an audio transducer (e.g., microphone) and converted to an electronic signal (digital or analog form). While these signals are typically processed in electronic and digital form to implement the components and processes described above, they may also be captured, processed, transferred and stored in other physical forms, including electronic, optical, magnetic and electromagnetic wave forms. The content signals are transformed in various ways and for various purposes during processing, producing various data structure representations of the signals and related information. In turn, the data structure signals in memory are transformed for manipulation during searching, sorting, reading, writing and retrieval. The signals are also transformed for capture, transfer, storage, and output via display or audio transducer (e.g., speakers).

In the interest of conciseness, the myriad variations and combinations of the described technology are not cataloged in this document. Applicant recognizes and intends that the concepts of this specification can be combined, substituted and interchanged—both among and between themselves, as well as with those known from the cited prior art. Moreover, it will be recognized that the detailed technology can be included with other technologies—current and upcoming—to advantageous effect.

To provide a comprehensive disclosure without unduly lengthening this specification, applicant incorporates-by-reference the documents and patent disclosures referenced above. (Such documents are incorporated in their entireties, even if cited above in connection with specific of their teachings.) These references disclose technologies and teachings that can be incorporated into the arrangements detailed herein, and into which the technologies and teachings detailed herein can be incorporated.

A few of the arrangements particularly contemplated by applicant include:

A. A method comprising the acts:
  (a) using a cell phone to indicate a user's interest in a software widget promoted on a screen of a television, the widget providing content or interactivity related to video programming presented on said screen;
  (b) in response to the indicated interest, transferring a version of said software widget to the cell phone.

B. Method A that includes transferring the version of the software widget from the television to the cell phone.

C. Method A in which (a) includes gesturing towards the television screen with the cell phone.

D. Method A in which (a) includes using a camera associated with the cell phone to capture image data including at least a portion of the television screen.

E. Method A in which (a) includes using a microphone or camera associated with the cell phone to capture data from the television, deriving information from the captured data, and using the derived information to aid in identifying a software widget to be transferred to the cell phone.

F. Method A, including identifying to the cell phone, over a wireless network connection, one or more widgets that may be transferred G. Method A that includes rendering a sound effect associated with transferring of the software widget to the cell phone.

H. Method A wherein the sound effect comprises a sucking sound.

J. A method employing a network-connected television, on a screen of which is presented video programming and at least one icon representing a software widget, the widget being viewer-invocable to supplement the video programming with presentation of related content on the television screen, the method including the acts:
- transferring a counterpart software widget to a cell phone operated by the viewer of the television screen; and
- executing the counterpart widget on the cell phone, including supplementing the video programming on the television screen with presentation of related content on a screen of the cell phone;
- wherein the viewer's use of the widget on the cell phone does not interfere with enjoyment by others of the video programming on the television screen.

K. Method J wherein the invoked widget has a first degree of interactivity on the television screen, and the counterpart widget executing on the cell phone has a second degree of interactivity greater than the first degree of interactivity.

L. Method J that includes transferring the counterpart software widget to the cell phone using the network to which the television is connected.

M. A system comprising a television and a cell phone, the television and phone each comprising plural components including a display screen, a processor and a memory, components of the television being operative to present video programming on the television display screen, wherein:
- the memory of the television stores widget information that, in response to user selection, supplements the video programming with presentation of further content on the television screen; and
- the memory of the cell phone stores corresponding widget information that, in response to user selection, supplements the video programming with presentation of further content on the cell phone screen.

N. System M wherein at least one of said widget information comprises linking information by which the system communicates with a remote system to invoke operation of a widget.

P. System M wherein the widget in the memory of the television is branded with a commercial brand, and the widget in the memory of the cell phone is branded with the same commercial brand.

Q. System M wherein the widget in the memory of the television has a particular "look and feel," and the widget in the memory of the cell phone has the same "look and fell," wherein the user experiences presented by the widgets are congruent.

R. A method involving a television and a cell phone, comprising the acts:
- receiving information about an available software widget at the television, the software widget serving to complement video programming presented on a television screen with additional associated content or interactivity;
- transmitting a notification about the available software widget from the television;
- receiving the notification about the available software widget at the cell phone;
- in response to user input through a user interface of the cell phone, requesting the software widget;
- receiving widget data at the cell phone; and
- invoking the widget by user input through the user interface of the cell phone.

S. Method R that includes issuing a request from the cell phone for notification about available software widgets, to which the television responds by transmitting said notification.

T. Method R in which the user input to request the software widget comprises positioning the cell phone relative to the television in a prescribed manner.

U. Method R wherein the information about the new widget comprises the widget software V. Method R wherein the information about the new widget comprises linking information by which communication can be established with a remote system to invoke operation of the widget.

W. Method R wherein the information about the new widget comprises a link to a remote repository where widget software is stored.

X. A tangible medium storing software instructions which, when executed by a processor, yield a widget that serves to complement television programming with related content or interactivity, the software instructions receiving input data indicating whether the software is being executed by a television or by a cell phone, wherein if the software is executed by a cell phone, a richer experience is provided than if the software is executed by a television.

Y. A method comprising:
- establishing communication between a cell phone and a television, across a network connection, the cell phone including a screen on which a cell phone processor presents a keyboard user interface, in accordance with software instructions stored in a memory;
- receiving typed text through the keyboard user interface on the cell phone;
- transferring the typed text to the television across the network connection; and
- controlling an aspect of the television's operation in accordance with the transferred typed text.

Z. A method of distributing software to a cell phone, comprising the acts:
- electronically advertising availability of the software from a packet-based message broadcast from a television over a home network;
- promoting availability of the software by providing a visual notification thereof on a screen of the television;
- receiving a user indication of interest responsive to the visual notification;
- by reference to data from the packet-based message, transferring the software to the cell phone.

AA. Method Z that includes transferring the software from the television to the cell phone.

BB. A method of distributing software to a cell phone, comprising the acts:

capturing visual or audio output from a television using a cell phone;

by reference to the captured output, identifying a type of information being presented by the television;

identifying software relevant to the identified type of information;

presenting a notification to a user from the cell phone, alerting the user to the availability of said software; and in response to a user instruction, transferring the software to the cell phone for use by the user.

I claim:

1. A method comprising the acts:

a cell phone sensing information from a television, the information serving to identify a sporting event program being displayed on a screen of the television, and also serving to identify a television network that distributed the sporting event program, the displayed view of the sporting event having been selected by a television producer from among plural different camera views of the event;

based on said sensed information, downloading, to the cell phone, computer instructions specific to said television network;

executing said downloaded instructions to present, on a screen of the cell phone, a second screen experience determined by said television network;

wherein said second screen experience determined by said television network enables a user to select, for presentation on the screen of the cell phone, one of said plural camera views of the sporting event that is different than the view selected by the television producer;

the method further including the acts:

(a) identifying to the cell phone, over a wireless network connection, one or more software widgets available for transfer to the cell phone, the software widgets providing content or interactivity related to said sporting event program, the widget being promoted on said television screen;

(b) using the cell phone to indicate a user's interest in one of said software widgets and to initiate transfer of such widget to the phone; and (c) in response to the indicated interest, transferring a version of said software widget to the cell phone;

wherein the transferred version of said software widget comprises said computer instructions specific to said television network.

2. The method of claim 1 in which said sensing act is performed under the control of software in the cell phone, and the method includes determining that the cell phone is proximate to the television, and auto-launching said software in response to said determining.

3. The method of claim 1 in which said determining is based on location data about location of the television.

4. A system comprising a television and a cell phone, the television and phone each comprising plural components including a display screen, a processor and a memory, components of the television being operative to present sports programming from a television network on the television display screen, wherein:

the memory of the television stores widget information that, in response to user selection, supplements the sports programming with presentation of content or interactivity related to said sports programming on the television screen, said memory further storing software instructions for identifying to the cell phone, over a wireless network connection, one or more software widgets available for transfer to the cell phone;

the memory of the cell phone stores software instructions enabling the cell phone to: (a) identify to a user one or more software widgets that may be transferred to it over a wireless network connection, (b) enable the user to express interest in one or more of said widgets promoted on the television screen, and to initiate transfer of such widget to the phone, and (c) in response to the user's expressed interest, transfer a version of the software widget to the phone, the transferred version of the software widget comprising computer instructions specific to said television network, wherein the transferred widget supplements the sports programming with presentation of further content on the cell phone screen;

the sports programming comprises a view of a sporting event selected for transmission by a television producer from among plural different camera views of the event; and the further content comprises one of said camera views that is different than the camera view selected by the television producer.

5. In a cell phone comprising a screen, a processor, a memory, and software instructions in the memory for configuring the phone to produce a user interface employing said screen, an improvement comprising:

first means for identifying: (a) a sporting event program that is being displayed on a screen of the television, and (b) a television network that distributed the sporting event program, the sporting event program comprising a displayed view of the sporting event that was selected by a television producer from among plural different camera views of the event; and computer instructions stored in said memory, specific to said identified television network, that are configured to present a second screen experience determined by said television network on said screen, said second screen experience enabling a user to select, for presentation on the screen, one of said plural camera views of the sporting event that is different than the camera view selected by the television producer;

said computer instructions comprising widget software promoted on said screen of the television and transferred to the cell phone in response to interest expressed by said user.

6. The system of claim 5 that further includes second means for determining that the cell phone is proximate to the television, said second means auto-launching the first means.

* * * * *